United States Patent
Abdul-Gaffoor et al.

(10) Patent No.: US 9,008,728 B2
(45) Date of Patent: Apr. 14, 2015

(54) ANTENNA ARRANGEMENT FOR 3G/4G SVLTE AND MIMO TO ENABLE THIN NARROW BOARDERED DISPLAY PHONES

(71) Applicant: Motorola Mobility LLC, Libertyville, IL (US)

(72) Inventors: Mohammed R. Abdul-Gaffoor, Palatine, IL (US); Md Faisal Abedin, Lindenhurst, IL (US); Minh H. Duong, Lake Bluff, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 192 days.

(21) Appl. No.: 13/682,765

(22) Filed: Nov. 21, 2012

(65) Prior Publication Data

US 2014/0141731 A1    May 22, 2014

(51) Int. Cl.
*H04M 1/00* (2006.01)
*H04B 7/04* (2006.01)
*H04B 1/44* (2006.01)
*H01Q 1/24* (2006.01)

(52) U.S. Cl.
CPC ............... *H04B 7/0413* (2013.01); *H04B 1/44* (2013.01); *H01Q 1/243* (2013.01)

(58) Field of Classification Search
USPC ........................ 343/562.1, 82, 83, 121, 129; 455/700 MS, 846, 876, 702, 854, 853
See application file for complete search history.

(56) References Cited

U.S. PATENT DOCUMENTS

| | | | |
|---|---|---|---|
| 6,154,177 A | 11/2000 | Saito et al. | |
| 6,909,401 B2 | 6/2005 | Rutfors et al. | |
| 7,292,195 B2 | 11/2007 | Phillips et al. | |
| 7,750,866 B2 | 7/2010 | Rambeau et al. | |
| 8,725,102 B2 * | 5/2014 | Winters et al. | 455/277.2 |
| 8,744,504 B2 * | 6/2014 | Faccin et al. | 455/507 |
| 2006/0109191 A1 | 5/2006 | Shtrom et al. | |

(Continued)

FOREIGN PATENT DOCUMENTS

WO    2012008946 A1    1/2012

OTHER PUBLICATIONS

Qinjiang Rao et al.: Compact low coupling dual-antennas for MIMO applications in handheld devices, Antennas and Propagation Society International Symposium, 2009, APSURSI '09, IEEE, IEEE, Piscataway, NJ, USA, Jun. 1, 2009, pp. 1-4.

(Continued)

*Primary Examiner* — Sonny Trinh
(74) *Attorney, Agent, or Firm* — Faegre Baker Daniels LLP

(57) ABSTRACT

A method and system provides a multiple input multiple output (MIMO) antenna arrangement in a wireless communication device. A first antenna element and a second antenna element co-located within a same antenna volume are respectively coupled to first and second antenna feeds proximate to a base perimeter segment of a device chassis. The first antenna feed is at a pre-calculated distance from the second antenna feed. The second antenna element, a first MIMO antenna, is coupled to an antenna ground positioned proximate to the first antenna feed and at a pre-determined distance from the second antenna feed. A third antenna element operating as a second MIMO antenna is placed proximate to a top perimeter segment of the device chassis. The antenna arrangement achieves (a) low correlation between the MIMO antennas and (b) an acceptable or pre-determined level of antenna isolation between the first antenna element and the second antenna element.

20 Claims, 10 Drawing Sheets

(56) References Cited

U.S. PATENT DOCUMENTS

| | | |
|---|---|---|
| 2007/0200773 A1 | 8/2007 | Dou et al. |
| 2010/0156726 A1 | 6/2010 | Montgomery et al. |
| 2011/0102268 A1 | 5/2011 | Watanabe et al. |
| 2011/0122035 A1 | 5/2011 | Montgomery et al. |
| 2013/0069836 A1 * | 3/2013 | Bungo .......................... 343/724 |

OTHER PUBLICATIONS

Patent Cooperation Treaty, International Search Report and Written Opinion of the International Searching Authority for International Application No. PCT/US2013/068199, Feb. 4, 2014 12 pages.

* cited by examiner

ANTENNA ARRANGEMENT FOR 3G/4G SVLTE AND MIMO TO ENABLE THIN NARROW BOARDERED DISPLAY PHONES

BACKGROUND

1. Technical Field

The present disclosure relates in general to wireless communication devices and in particular to antenna arrangements in wireless communication devices.

2. Description of the Related Art

With the rapid deployment of Long Term Evolution (LTE) Fourth Generation (4G) networks, an increasing number of wireless communication providers are implementing Simultaneous Voice and LTE (SVLTE) data technologies. For example, voice communication within SVLTE is supported using Third Generation and/or Code Division Multiple Access (CDMA) technologies and data communication is provided using 4G technologies, which can be supported in more recently designed smart-phones.

While providing SVLTE communication (e.g., by using LTE Band 13 and the CDMA850 band), wireless communication devices can experience high levels of desensitization of receivers in select channels of CDMA850 and LTE Band 13. These high levels of receiver desensitization present a serious challenge to designers of wireless communication devices. Furthermore, designers are challenged to provide acceptable levels of LTE multiple input multiple output (MIMO) performance by utilizing LTE receive antennas that are not correlated. In order to mitigate SVLTE desensitization, some conventional approaches utilize highly linear and large sized ceramic filters or a number of smaller filters in the front end, as well as high third order intercept point (IP3) PIN switches. The large filter or even the smaller filters cannot be packed in a thin phone design. Furthermore, the antenna bandwidth requirement to cover a wide low band requires a relatively large ground clearance distance, which requires a greater phone Y dimension (i.e., length).

Another approach employs (a) a separate 3G (CDMA) and LTE transmit antenna to realize antenna isolation of at least 10 dB and (b) small size notch filters on the front end. For example, a separate CDMA main antenna is positioned on the bottom of the device and a separate LTE antenna at the top of the device for signal transmission (Tx) only or for both signal transmission and reception (Tx/Rx). However, having a transmit antenna at the top of the phone results in higher Specific Absorption Rate (SAR) and poor "Phantom" Performance. SAR compliance is generally challenging with multiple antenna/transmitters in phones. In a thin phone, the SAR performance and Phantom performance that is used to measure detuning impact are both reduced when a transmit antenna is positioned at the top of the wireless communication device. Generally, a thin phone has a substantially uniform thickness of less than 10 mm or a "bump" segment at the top of the device, which bump segment generally has a thickness that is greater than 10 mm.

In other approaches, separate 3G (CDMA) antenna and LTE antennas at the four corners of the phones (either combined diagonally or individually excited) are utilized. In this case, each antenna element has its own antenna volume spread partially around the bottom/top edges and the side edges. Having a transmit antenna at the top or upper side (even if combined with a bottom antenna element) still has significant SAR issues in a thin phone. Also, Phantom performance is worse when the antenna is placed at the top or the side of the device than when the antenna is positioned at the bottom of the device. Having the antenna elements positioned on the sides makes the X dimension (i.e., width) of the product significantly wider than the display width requires. A tighter X dimension of the phone becomes critical to comfortably holding the phone when a bigger display size is used. A wider X dimension makes the border around the display larger. Furthermore, having portions of the main antenna elements on the bottom sides of the phones make the antenna elements more susceptible to significant hand detuning/loading "variation" effects in natural hand holding talk positions than having antenna elements entirely confined to the bottom.

BRIEF DESCRIPTION OF THE DRAWINGS

The described embodiments are to be read in conjunction with the accompanying drawings, wherein.

DETAILED DESCRIPTION

Figure 1:
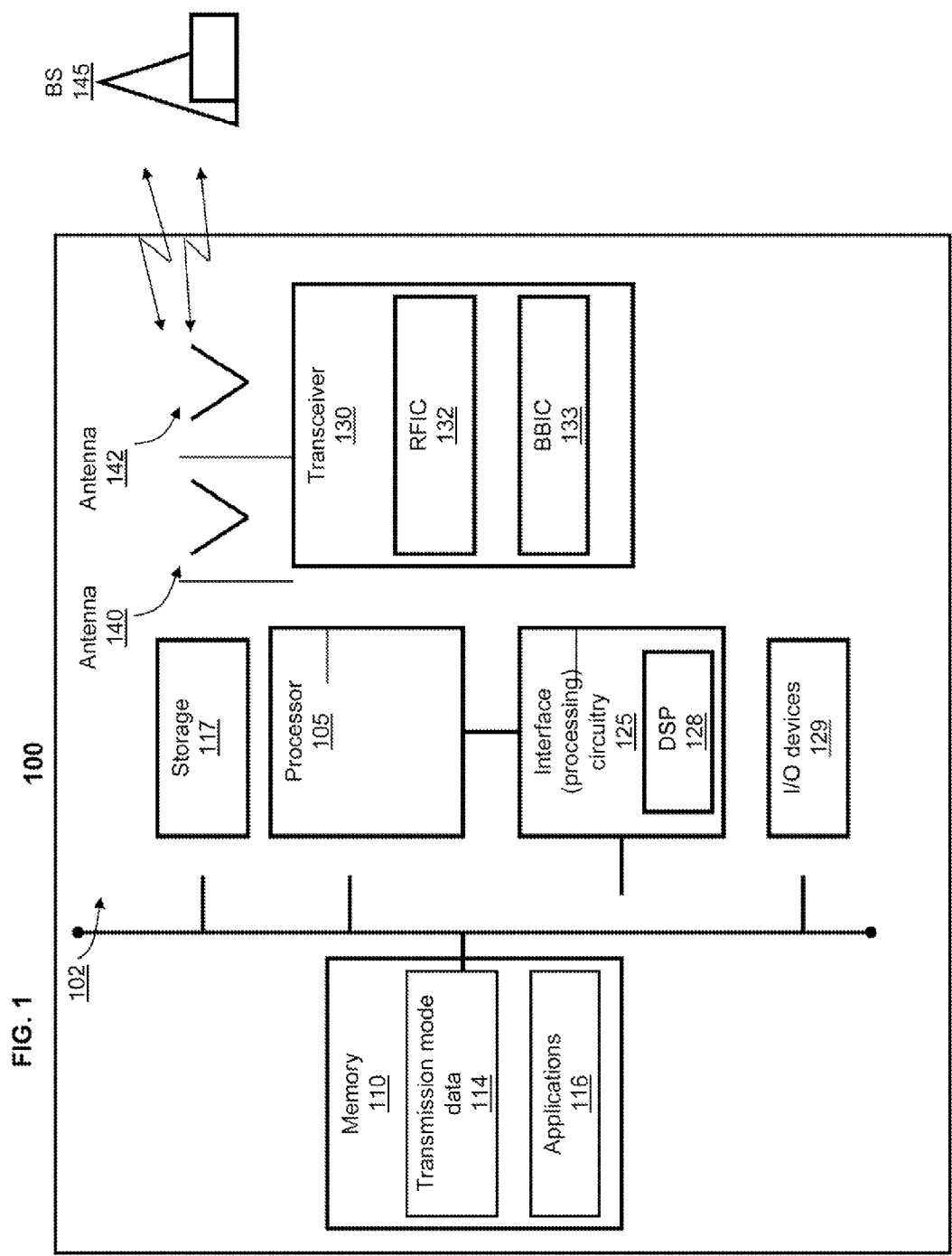
FIG. 1 is a block diagram illustrating an example wireless communication device within which the various features of the described embodiments can be advantageously implemented, according to one embodiment.

The illustrative embodiments provide a method and system for providing a multiple input multiple output (MIMO) antenna arrangement in a wireless communication device. A first antenna element and a second antenna element co-located within a same antenna volume are respectively coupled to first and second antenna feeds proximate to a base perimeter segment of a device chassis. The first antenna feed is positioned at a pre-calculated distance from the second antenna feed. The second antenna element, designated as a first MIMO antenna, is coupled to an antenna ground positioned proximate to the first antenna feed and at a pre-determined distance from the second antenna feed. A second MIMO antenna is placed proximate to a top perimeter segment of the device chassis. The antenna arrangement achieves (a) low correlation between the first MIMO antenna and the second MIMO antenna, (b) an acceptable or pre-determined level of antenna isolation between the first antenna element and the second antenna element, and (c) an acceptable or pre-determined level of antenna isolation between any transmit and receive antennas that are simultaneously utilized for signal propagation. The various aspects of the method are described below with reference to the figures.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Within the disclosure, terms such as "pre-set", "pre-determined", "pre-defined", "pre-established" and/or "pre-calculated" can be utilized to define a parameter, a variable, a component, and/or a characteristic that at the time of utilization within a described process is already known or established and either (a) has been programmed directly into the execution code implementing the process or (b) is accessible for retrieval from storage or (c) was computed or determined in an earlier-in-time function in the overall process. The information used to define the parameter, variable, component, or characteristic can be determined in advance of performing the specific steps of the disclosed method or process by using at least one of (a) empirical tests/data, (b) pre-design calculations, computations, testing, and/or experimentation, and/or (c) an arbitrary or random selection methodology. However, the exact method by which this information is determined and/or generated is not dispositive on the underlying functionality being performed by the claims of the disclosure. More importantly, all of these terms are intended to clearly inform the reader that the parameter or variable provides a previously identified value that can be either a stored value, a pre-programmed or hard-coded value, of an earlier-in-time determined value during processing. From this perspective, these terms are to be given their broadest interpretation within the context of the disclosure. Other terms that can be similarly used to indicate pre-programmed and/or stored information include, without limitation, the following: "known", "acceptable", "desired", and other related words and/or phrases.

To further explain the use of these terms that indicate pre-programmed and/or stored information, reference is made to specific usage of the terms within the disclosure. For example, as utilized herein, the phrase "a pre-determined level of isolation between at least two antenna elements" refers to a stored value or range of values for an antenna isolation parameter. Similarly, the phrase "a pre-defined low level of correlation between a first MIMO receiving antenna and a second MIMO receiving antenna" refers to a stored value or range of values for a parameter for a low level of antenna correlation. In one embodiment, both of these stored values are generated through empirical and/or in-the-field analyses, and are maintained within a table or file providing antenna configuration information. This table can be stored on a computing device which is utilized during the design phase.

As described within the background, one conventional approach for providing support for simultaneous voice and long term evolution (SVLTE) (e.g., LTE B13 and code division multiple access (CDMA) 850 band) utilizes a single antenna. In order to minimize de-sensitization in this conventional approach, at least one of a relatively large ceramic filter(s) and high third order intercept (IP3) PIN switches are utilized. Other conventional approaches utilize multiple antennas. However, these other conventional approaches encounter significant specific absorption rate (SAR) performance issues. In addition, as previously described, these conventional approaches are highly susceptible to significant hand detuning/loading "variation" effects.

The disclosure describes a multiple antenna arrangement that (a) avoids the use of relatively large ceramic filters and high IP3 PIN switches utilized in the conventional approach and (b) supports a relatively smaller phone package design. In particular, separate antennas for voice and data transmission are employed to support SVLTE. Although, multiple antennas are also utilized in some conventional approaches and many multiple antenna arrangements are possible, specific multiple antenna arrangements providing high performance are selected for the disclosure. The selected multiple antenna arrangements described in the disclosure overcomes the SAR performance issues, the hand detuning/loading "variation" effects and other performance issues encountered by the conventional approaches. These specific antenna arrangements providing high performance are identified by performing experiments and simulations in which antenna elements and associated components (e.g., antenna feed and ground termination) are placed and/or assembled in various relative positions proximate to a device printed circuit board (PCB) and a device housing. Aspects of a relative antenna placement include: (a) selecting a position for a first antenna element and placing a second antenna element in a position that is dependent upon the position selected for the first antenna element; (b) relative placement of antenna feeds corresponding to the first and second antenna elements; and (c) relative placement of an antenna feed corresponding to the first antenna element and a ground line of the second antenna element.

Antenna radiation efficiency, SAR performance, antenna isolation performance and antenna correlation performance are appropriately measured for the various configurations. Antenna arrangements are selected based on how well performance requirements are satisfied. These performance requirements can include a number of "pre-determined" and "pre-defined" parameter values (e.g., inter-antenna isolation and/or inter-antenna correlation values) that are described within the disclosure. These performance requirements can be maintained in storage on a computer utilized during a design phase for the high performance antenna arrangements.

Experimental investigation is also performed to determine suitable/high performance antenna types for various antenna arrangements and transmission and operating modes. For example, in one embodiment, two different types of compatible antenna elements, an inverted L antenna (ILA) and a Loop antenna are considered for LTE B13 transmission. These various types of antenna elements are further described within the disclosure.

Based on experiments, simulations and calculations involving various configurations, it is observed that the relative positioning and placing of antenna related components provide multiple novel high performance antenna arrangements. These novel high performance antenna arrangements are illustrated and described within the disclosure and specified within the claims.

In the foregoing discussion, the disclosure is described with reference to a specific example of SVLTE (3G/4G) applications. However, the disclosed ideas and concepts can be extended to be used in Multiple Input Multiple Output (MIMO) and Carrier Aggregation applications, where multiple transceivers and antenna combinations are utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

With specific reference now to FIG. 1, there is depicted a block diagram of an example wireless communication device 100, within which the functional aspects of the described embodiments may advantageously be implemented. Wireless communication device 100 represents a device that is adapted to transmit and receive electromagnetic signals over an air interface via uplink and/or downlink channels between the wireless communication device 100 and communication network equipment (e.g., base-station 145) utilizing a plurality of different communication standards including Global System for Mobile Communications (GSM), Code Division Multiple Access (CDMA) and Long Term Evolution (LTE). In one or more embodiments, the wireless communication device can be a mobile cellular device/phone or devices. Wireless communication device 100 comprises processor 105 and interface circuitry 125, which includes digital signal processor (DSP) 128. Processor 105 and interface circuitry 125 are connected to memory component 110 via signal bus 102. Wireless communication device 100 includes a transceiver integrated circuit (IC) 130 for sending and receiving communication signals. In at least some embodiments, the sending and receiving of communication signals occur wirelessly and are facilitated by one or more antennas 140 and 142 coupled to the transceiver IC 130. The number of antennas can vary from device to device, ranging from a pair of antennas to three or more antennas, and the presentation within wireless communication device 100 of two antennas is merely for illustration. In the described embodiments, the antennas 140, 142 are coupled via respective antenna feeds to a corresponding signal communication component and are positioned in various arrangements within wireless communication device 100. Antenna arrangements within wireless communication device 100 are described in greater detail in FIG. 2 and the other figures. Wireless communication device 100 is able to wirelessly communicate to base station 145 via antenna 140 and antenna 142. Base station 145 can be any one of a number of different types of network stations and/or antennas associated with the infrastructure of the wireless network, and configured to support uplink and downlink communication via one or more of the wireless communication protocols, as known by those skilled in the art. Transceiver IC 130 comprises baseband integrated circuit (BBIC) 133 and radio frequency integrated circuit (RFIC) 132. In one implementation, transceiver IC 130 may represent signal communication component 212 of FIG. 2.

The various components within wireless communication device 100 can be electrically and/or communicatively coupled together as illustrated in FIG. 1. As utilized herein, the term "communicatively coupled" or "coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 1, it is to be understood that more, fewer or different interconnections may be present in other embodiments.

The following figures provide various configurations of an antenna structure. Each configuration of the antenna structure comprises a plurality of antenna elements configured in an arrangement of relative spacing and relative position of antennas, where each of the plurality of antenna elements are coupled to a respective antenna feed, and where at least one antenna element from among the plurality of antenna elements is respectively coupled to a corresponding antenna ground line. Each of at least two components from among (a) the plurality of antenna elements, (b) corresponding antenna feeds, and (c) corresponding antenna ground lines is positioned relative to other components to provide a multiple input multiple output (MIMO) antenna configuration exhibiting at least one of (1) a pre-determined level of isolation between at least two antenna elements among the plurality of antenna elements and (2) a pre-defined low level of correlation between a first MIMO receiving antenna and a second MIMO receiving antenna. Each of the plurality of antenna elements is at least (a) placed proximate to a particular perimeter segment of the device chassis, and/or (b) affixed to a surface of a corresponding housing panel of a device housing that encloses the device chassis.

Figure 2:
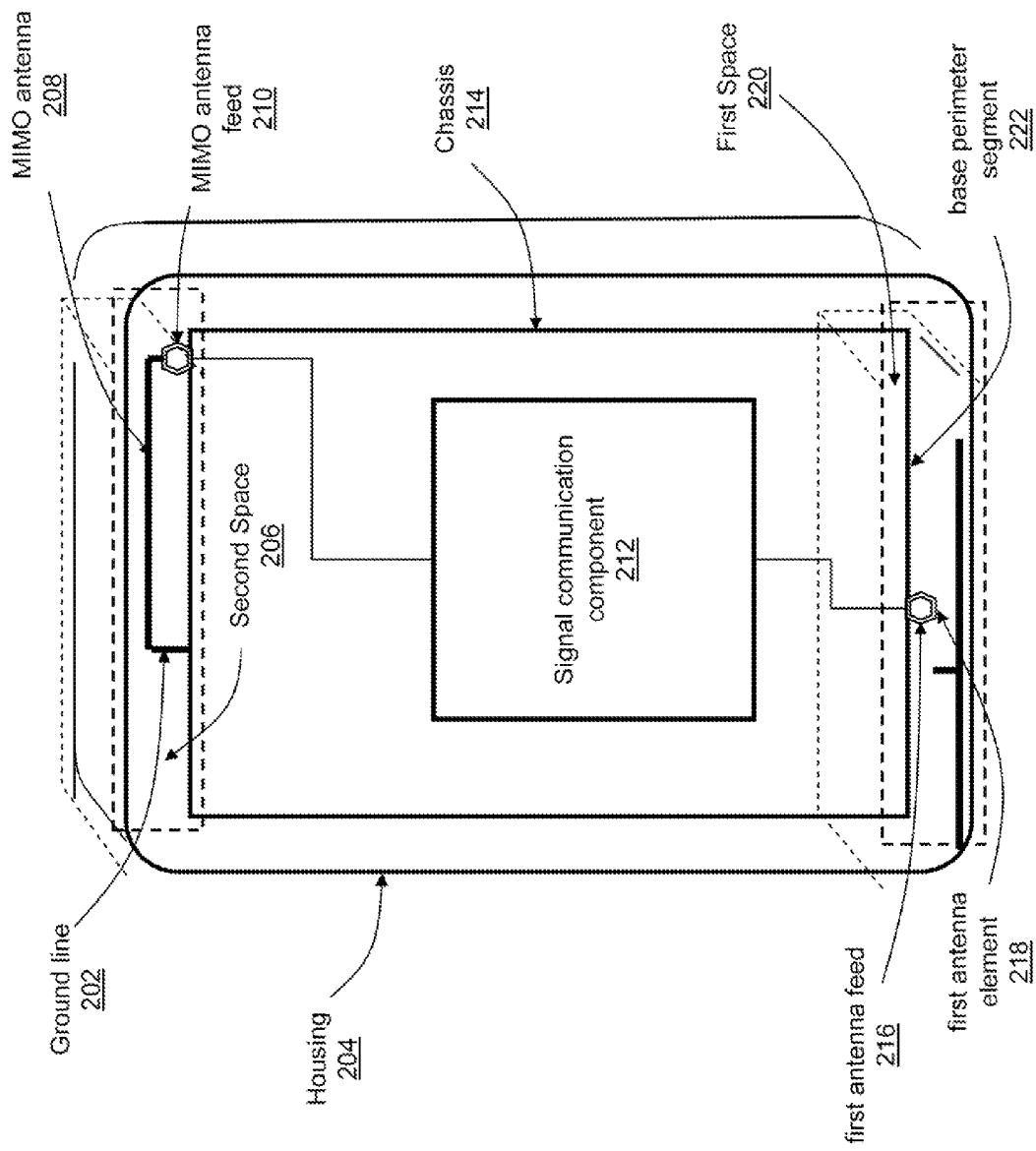
FIG. 2 provides a block diagram representation of an antenna structure of a wireless communication device, according to one embodiment.

FIG. 2 provides a block diagram representation of an antenna structure of a wireless communication device, according to one embodiment. FIG. 2 is described with reference to FIGS. 3A and 3B. Antenna structure 200 provides an antenna arrangement and configuration for a wireless communication device 100, which comprises a device housing 204 that encloses a device chassis 214. Device housing 204 is an external casing or structure that is described herein as comprising a number of interconnected panels including a base panel (e.g., base panel 323 shown in FIGS. 3A, 3B) and a top panel, opposed to the base panel (e.g., opposing/top panel 334 shown in FIG. 3B). A perimeter of device chassis 214 is divided into a number of segments including a base perimeter segment 222. A number of well defined regions or spaces, including first space 220, are presented. In one embodiment, first space 220 includes at least a pre-defined area of device chassis 214 that is bordered by base perimeter segment 222. In one or more embodiments, first space 220 also includes at least a pre-defined segment of device housing 204. First space 220 can be divided into a number of sections (e.g., 312, 318 of FIG. 3A). Antenna structure 200 comprises a plurality of antenna elements including first antenna element 218 positioned to be at least partially located within first space 220, which is substantially adjacent to a base perimeter segment of device chassis 214. As noted above, components of at least one signal communication circuit 212 are affixed to device chassis 214. Antenna structure 200 also comprises first antenna feed 216 extending from the signal communication circuit into first space 220 and coupled to first antenna element 218 within first space 220.

In the illustrative embodiment, antenna structure 200 includes a second antenna element within first space 220. Antenna structure 200 includes an additional antenna, MIMO antenna 208, within second space 206. Second space 206 is located at an opposing end of chassis 214 relative to first space 220. MIMO antenna 208 may represent one of a number of multiple input multiple output (MIMO) antennas.

Antenna structure 200 further comprises MIMO antenna feed 210 which is at least partially located within second space 206 and coupled, within second space 206, to MIMO antenna 208. Antenna structure 200 also comprises antenna ground line 202 attached to a ground plane (not shown) and coupled within second space 206 to MIMO antenna 208. In one embodiment, the ground plane is affixed to device chassis 214. The ground connection is at a pre-calculated separation distance from MIMO antenna feed 210. First antenna feed 216 and MIMO antenna feed 210 are each associated with at least one signal communication circuit.

Figure 3A:
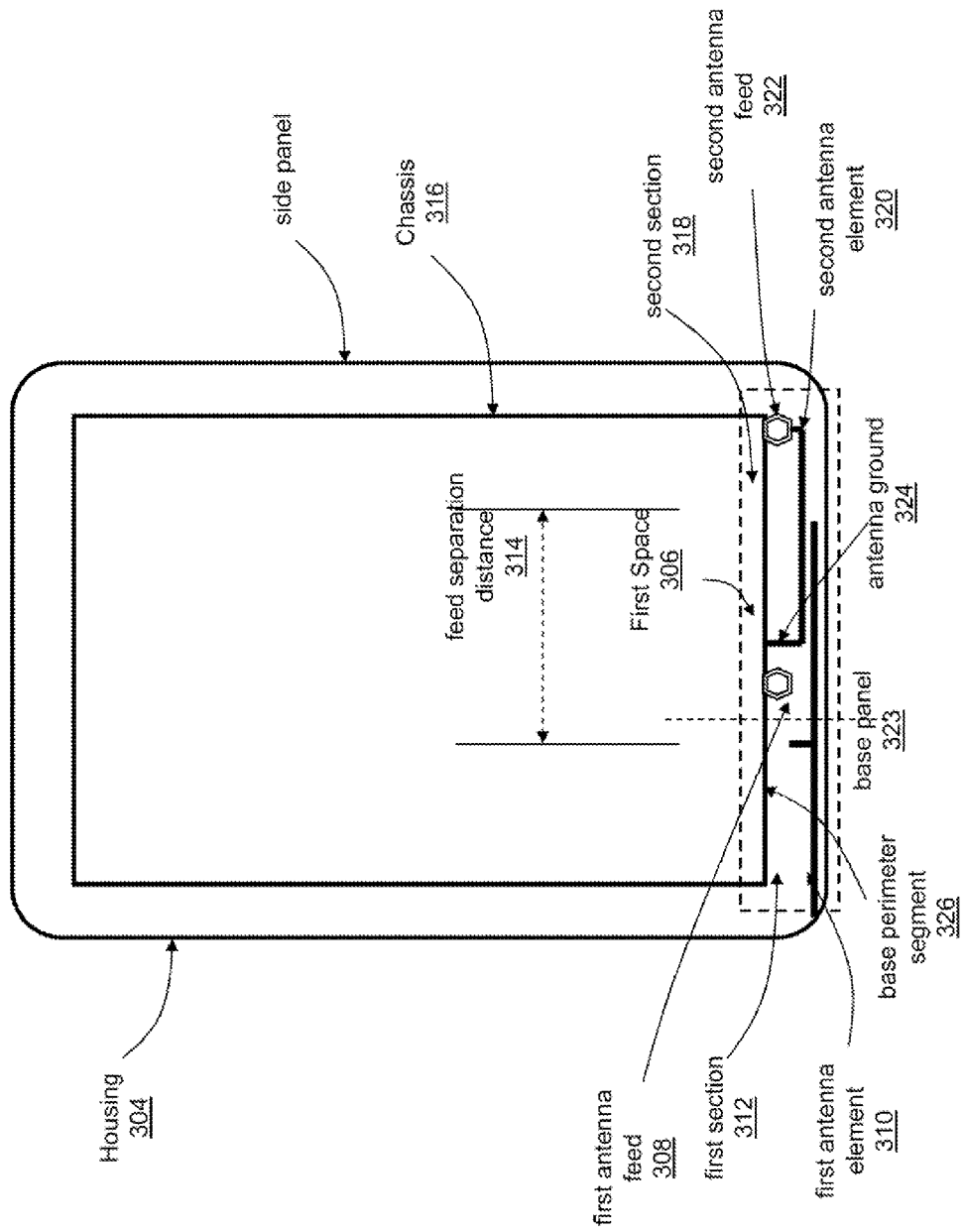
FIG. 3A provides a block diagram representation of an aerial view of a second antenna structure of a wireless communication device, according to one embodiment.

FIG. 3A provides a block diagram representation of an aerial view of a second antenna structure of a wireless communication device, according to one embodiment. Antenna structure 300 comprises a plurality of antenna elements including first antenna element 310. First antenna element 310 is positioned to be at least partially located within first space 306 which is substantially adjacent to base perimeter segment 326 of device chassis 316. Antenna structure 300 also comprises first antenna feed 308 extending from the signal communication circuit (not shown) into first space 306 and coupled to first antenna element 310 within first space 306.

First antenna feed 308 is at least partially located within first section 312 of first space 306 at a first pre-calculated offset distance from a center position of first space 306. As illustrated, first section 312 is opposed to second section 318. Antenna structure 300 also comprises second antenna element 320 located within a same antenna volume as first antenna element 310. Second antenna element 320 is also at least partially located within first space 306. In addition, antenna structure 300 comprises second antenna feed 322 coupled within second section 318 of first space 306 to second antenna element 320. Second antenna feed 322 is located at a second pre-calculated offset distance from a center position of first space 306.

Also shown is antenna ground line 324 attached to a ground plane and coupled within second section 318 to second antenna element 320. Antenna ground line 324 is at a first pre-calculated separation distance from second antenna feed 322. Antenna ground line 324 does not cross first antenna feed 308.

First antenna feed 308 and second antenna feed 322 are placed in first positions relative to each other, which relative first positions result in feed separation distance 314 between first antenna feed 308 and second antenna feed 322. In addition to placing first antenna feed 308 and second antenna feed 322 in the relative first positions, first antenna feed 308 and antenna ground line 324 are placed in second positions relative to each other, in order to achieve a pre-determined level of isolation between first antenna element 310 and second antenna element 320.

In one implementation, first antenna element 310 is at least one of (a) a dual-band inverted L antenna (DILA), (b) an inverted F antenna (IFA), (c) a planar inverted F antenna (PIFA), and (d) a variant of a monopole antenna. The DILA, the IFA, the PIFA, and the variant of a monopole antenna each provide a corresponding frequency band response. Additionally, in one or more embodiments, second antenna element 320 is a loop antenna. First antenna element 310 and second antenna element 320 are respectively configured to provide a first frequency response and a second frequency response to support a simultaneous voice and data communication mode. First antenna element 310 and second antenna element 320 are placed in pre-calculated positions relative to each other to achieve a pre-determined level of antenna isolation.

In one embodiment, antenna structure 300 can be utilized to support simultaneous voice and data transmission (e.g., SVLTE). However, another embodiment, which is provided by antenna structure 350 shown in FIG. 3B, depicts an antenna arrangement that is used to support both (a) simultaneous voice and data transmission (e.g., SVLTE) and (b) for multiple input multiple output (MIMO) communication.

Figure 3B:
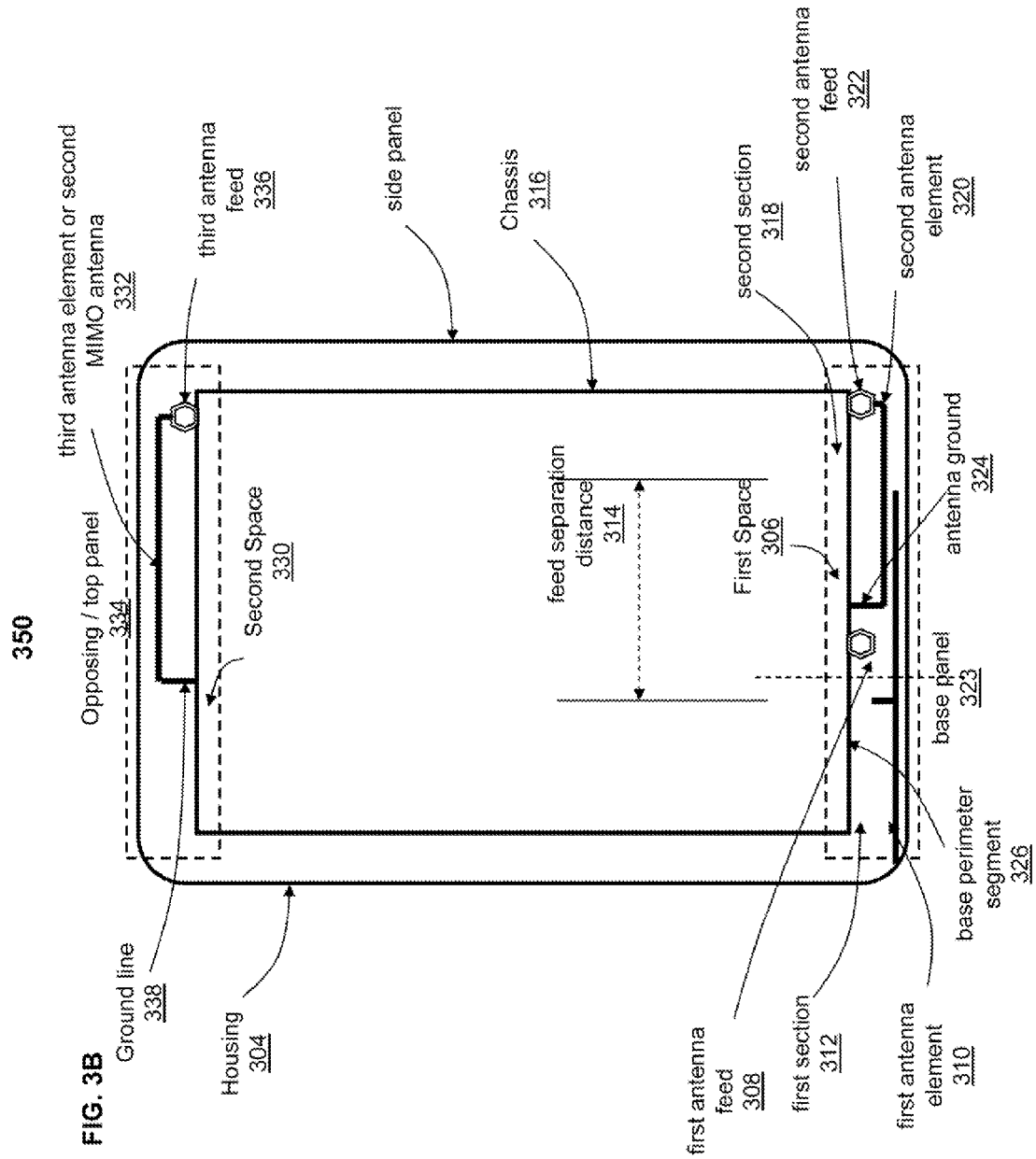
FIG. 3B provides a block diagram representation of a third antenna structure of a wireless communication device, according to one embodiment.

FIG. 3B provides a block diagram representation of a third antenna structure of a wireless communication device, according to one embodiment. Similarly to antenna structure 300, antenna structure 350 comprises first antenna element 310 and second antenna element 320 both positioned to be at least partially located within first space 306. However, unlike antenna structure 300, antenna structure 350 includes a third antenna element that operates as a MIMO receiving antenna. As a result, antenna structure 350 is used to support both (a) simultaneous voice and data transmission (e.g., SVLTE) and (b) for multiple input multiple output (MIMO) communication.

In antenna structure 350, at least one of first antenna element 310 and second antenna element 320 is configured for use as a MIMO receiving antenna. When first antenna element 310 is configured for use as a first MIMO receiving antenna, second antenna element 320 is configured as a transmit antenna. Alternatively, second antenna element 320 is configured for use as a transmit and receive antenna when second antenna element 320 is the first MIMO receiving antenna.

Antenna structure 350 further comprises a third antenna element that operates as, and is thus referred to as second MIMO receiving antenna 332. Second MIMO receiving antenna 332 is at least partially located within second space 330 adjacent to a second perimeter segment of device chassis 316. Second space 330 is at an opposing end of chassis 316 relative to first space 306. Antenna structure 350 further comprises third antenna feed 336 located within second space 330 and coupled within second space 330 to second MIMO receiving antenna 332. Antenna structure 350 also comprises a MIMO-antenna ground line (338) attached to a ground plane and coupled within second space 330 to second MIMO receiving antenna 332. The MIMO-antenna ground line 338 is at a second pre-calculated separation distance from third antenna feed 336.

Second MIMO receiving antenna 332, third antenna feed 336 and the MIMO-antenna ground line 338 are respectively positioned relative to at least one of (a) first antenna element 310, (b) first antenna feed 308, (c) second antenna element 320, (d) second antenna feed 322, and (e) antenna ground line 324 of second antenna element 320, in order to achieve a low level of correlation between second MIMO receiving antenna 332 and at least one of first antenna element 310 and second antenna element 320, respectively. First antenna feed 308, second antenna feed 322, and third antenna feed 336 are each associated with at least one signal communication circuit (not shown).

Figure 4:
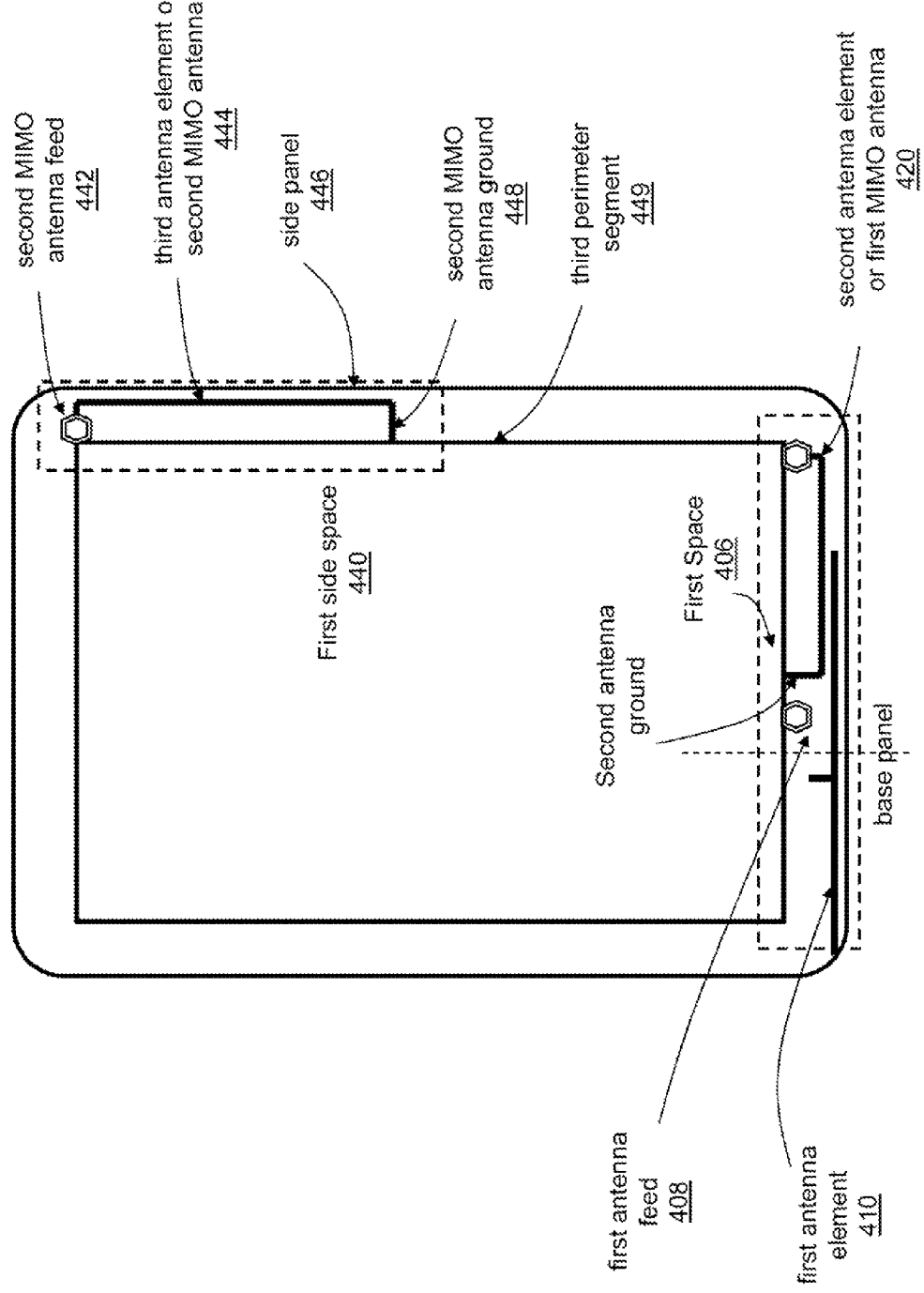
FIG. 4 provides a block diagram representation of a fourth antenna structure of a wireless communication device, according to one embodiment.

FIG. 4 provides a block diagram representation of a fourth antenna structure of a wireless communication device, according to one embodiment. The configuration of antennas within the first space for antenna structure 400 is similar to that of antenna structure 300. Both antenna structure 400 and antenna structure 300 include a first antenna element (310, 410) and a second antenna element (320, 420) within a first space (306, 406). However, a third antenna element is at least partially located within a first side space 440.

The third antenna element operates as a second MIMO receiving antenna and is illustrated as second MIMO receiving antenna 444. First side space 440 is adjacent to third perimeter segment 449 of the device chassis. Third perimeter segment 449 is substantially perpendicular to the base perimeter segment and the second/top perimeter segment of the device chassis. Antenna structure 400 comprises a third antenna feed which is at least partially located within first side space 440 and is coupled within first side space 440 to second MIMO receiving antenna 444. Antenna structure 400 also comprises MIMO-antenna ground line 448 attached to a ground plane and coupled within first side space 440 to second MIMO receiving antenna 444. The third ground connection point is at a third pre-calculated separation distance from the third antenna feed. Second MIMO receiving antenna 444, the third antenna feed and second MIMO-antenna ground line 448 are placed in pre-established positions relative to at least one of (a) first antenna element 410, (b) the first antenna feed 408, (c) second antenna element 420, (d) the second antenna feed 442, and (e) the antenna ground line of second antenna element 420, in order to achieve a pre-defined low level of correlation between second MIMO receiving antenna 420 and second MIMO receiving antenna 444. First antenna element 410 and the second antenna element 420, are positioned to achieve an acceptable level of antenna isolation between the two antennas. Second antenna element 420 operates as second MIMO receiving antenna. The first antenna feed, the second antenna feed, and the third antenna feed are each associated with at least one signal communication circuit.

Figure 5:
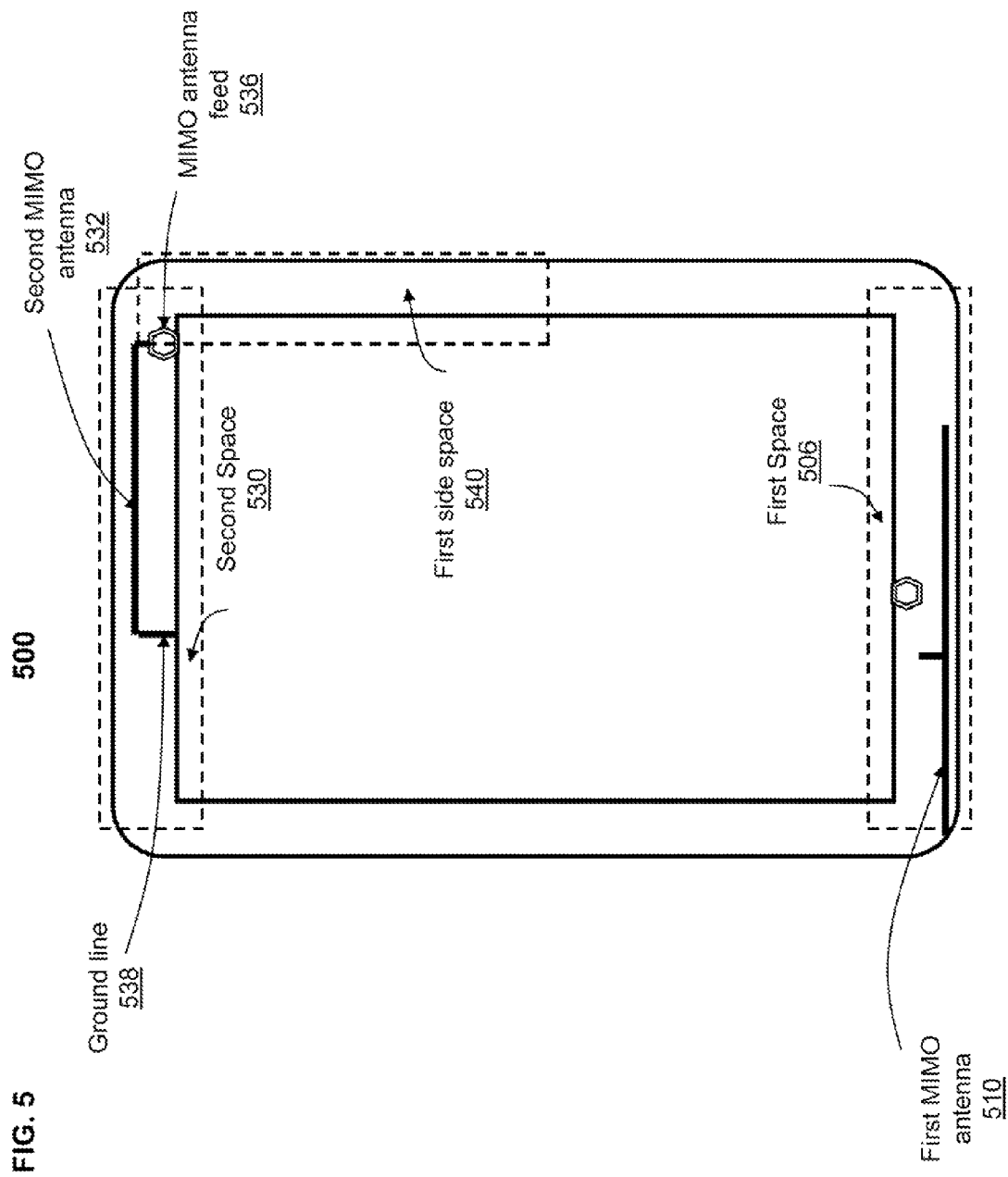
FIG. 5 provides a block diagram representation of a fifth antenna structure of a wireless communication device, according to one embodiment.

FIG. 5 provides a block diagram representation of a fifth antenna structure of a wireless communication device, according to one embodiment. Antenna structure 500 comprises first antenna element 510 at least partially located within first space 506 and second antenna element 532 at least partially located within second space 530. First space 506 is adjacent to a base perimeter segment of the device chassis. Similarly, second space 530 is adjacent to a second perimeter segment of the device chassis. Second space 530 is opposed to first space 506, and second perimeter segment is an opposing perimeter segment to the base perimeter segment of the device chassis. In one embodiment, first antenna element 510 is utilized as a first MIMO receiving antenna, and second antenna element 532 is utilized as a second MIMO receiving antenna.

Antenna structure 500 further comprises MIMO-antenna feed 536 located within second space 530 and coupled within second space 530 to second MIMO receiving antenna 532. In addition, antenna structure 500 comprises MIMO-antenna ground line 538 attached to a ground plane and coupled within second space 530 to second MIMO receiving antenna 532. MIMO-antenna ground line 538 is at a second pre-calculated separation distance from MIMO-antenna feed 536.

In one implementation, first antenna element 510 is at least one of (a) a dual-band inverted L antenna (DILA), (b) a variant of a monopole antenna; and (c) a loop antenna. In a related implementation, second antenna element 532 is a loop antenna.

Second MIMO receiving antenna 532, MIMO-antenna feed 536, and MIMO-antenna ground line 538 are respectively positioned relative to at least one of (a) the first antenna element, (b) the first antenna feed, and (c) a ground line attached to the first antenna element, in order to achieve a pre-defined low level of correlation between first MIMO receiving antenna 510 and second MIMO receiving antenna 532.

In another embodiment, instead of having the second antenna element positioned within second space 530, the antenna structure can utilize a different placement for an alternative antenna element. For example, similar to a configuration for first side space 440 of FIG. 4, this alternative antenna element can be at least partially located within first side space 540 adjacent to a third perimeter segment of the device chassis. Within the first side space, the alternative antenna element, designated as an alternative second MIMO receiving antenna, is coupled to a corresponding MIMO-antenna feed. In addition, a MIMO-antenna ground line can be attached to a ground plane and coupled to the alternative second MIMO receiving antenna within the first side space. A ground connection point can be located at a pre-calculated separation distance from the MIMO-antenna feed corresponding to the alternative second MIMO receiving antenna.

Figure 6:
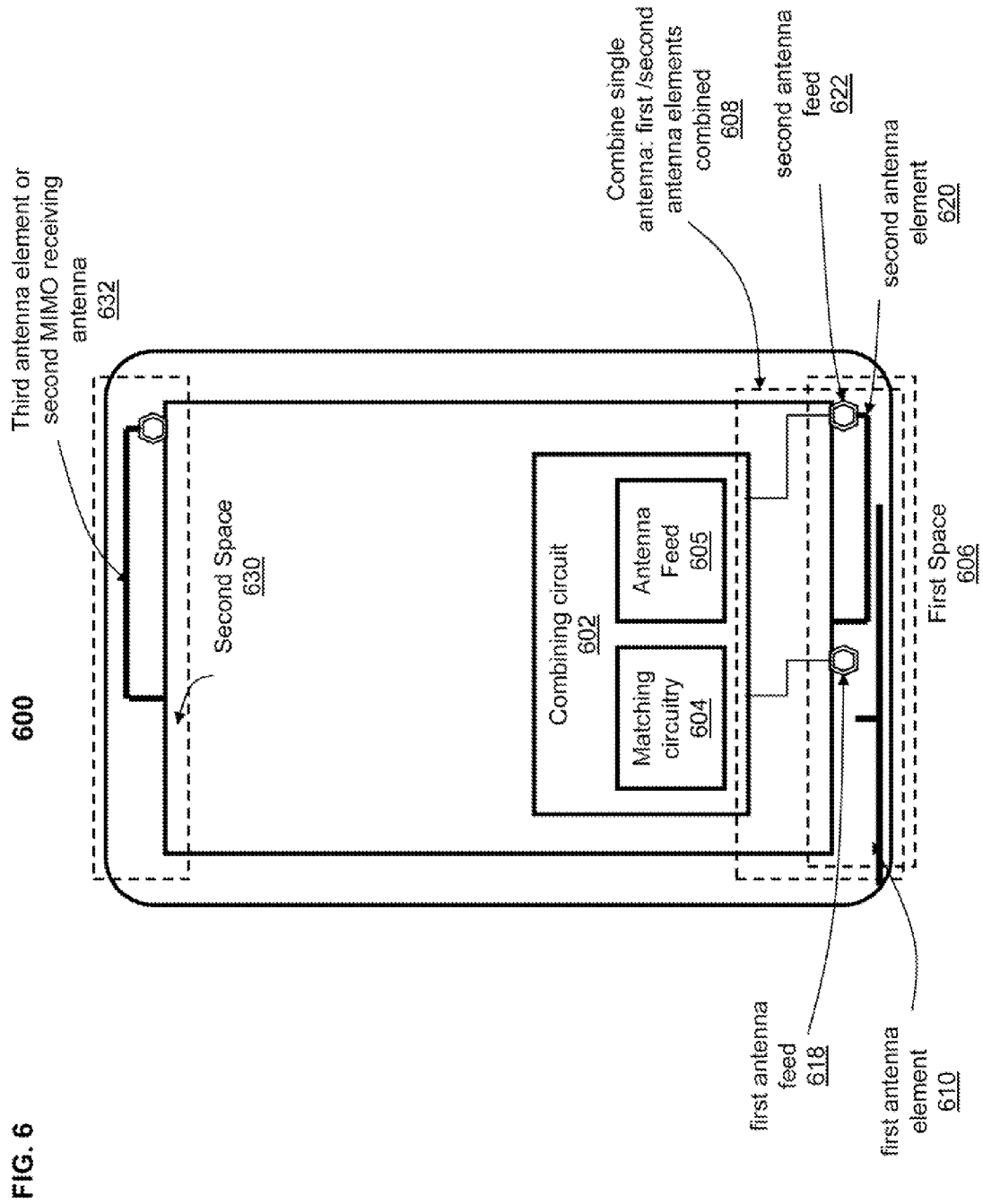
FIG. 6 provides a block diagram representation of a sixth antenna structure having an antenna combining circuit, according to one embodiment.

FIG. 6 provides a block diagram representation of a sixth antenna structure having an antenna combining circuit, according to one embodiment. Similarly to antenna structure 300, antenna structure 600 comprises first antenna element 610 and second antenna element 620 both positioned to be at least partially located within first space 606. In addition, antenna structure 600 further comprises a third antenna element that operates as second MIMO receiving antenna 632. Second MIMO receiving antenna 632 is at least partially located within second space 630, adjacent to a second perimeter segment of the device chassis. The relative positions of antenna elements, corresponding antenna feeds and ground lines within first space 606 are similarly provided as the relative placement of similar components within first space 306 of antenna structure 300 shown in FIG. 3B.

Antenna structure 600 also comprises combining circuit 602 which includes impedance matching circuitry 604. Combining circuit 602 combines first antenna element 610 and second antenna element 620 into combined single antenna 608 having a wide bandwidth for a low frequency band response. Antenna structure 600 also comprises a wideband antenna feed 605 associated with combined single antenna 608. Combined single antenna 608 provides a first MIMO receiving antenna. Wideband antenna feed 605 supports propagation of signals that require the wide bandwidth in the low frequency band. First antenna element 610 is pre-configured to provide a first frequency band response that is a high frequency band response. Second antenna element 620 is pre-configured to provide a second frequency band response. Combined single antenna 608 is configured to enable first antenna element 610 of combined single antenna 608 to substantially maintain and provide the high frequency band response.

Figure 7:
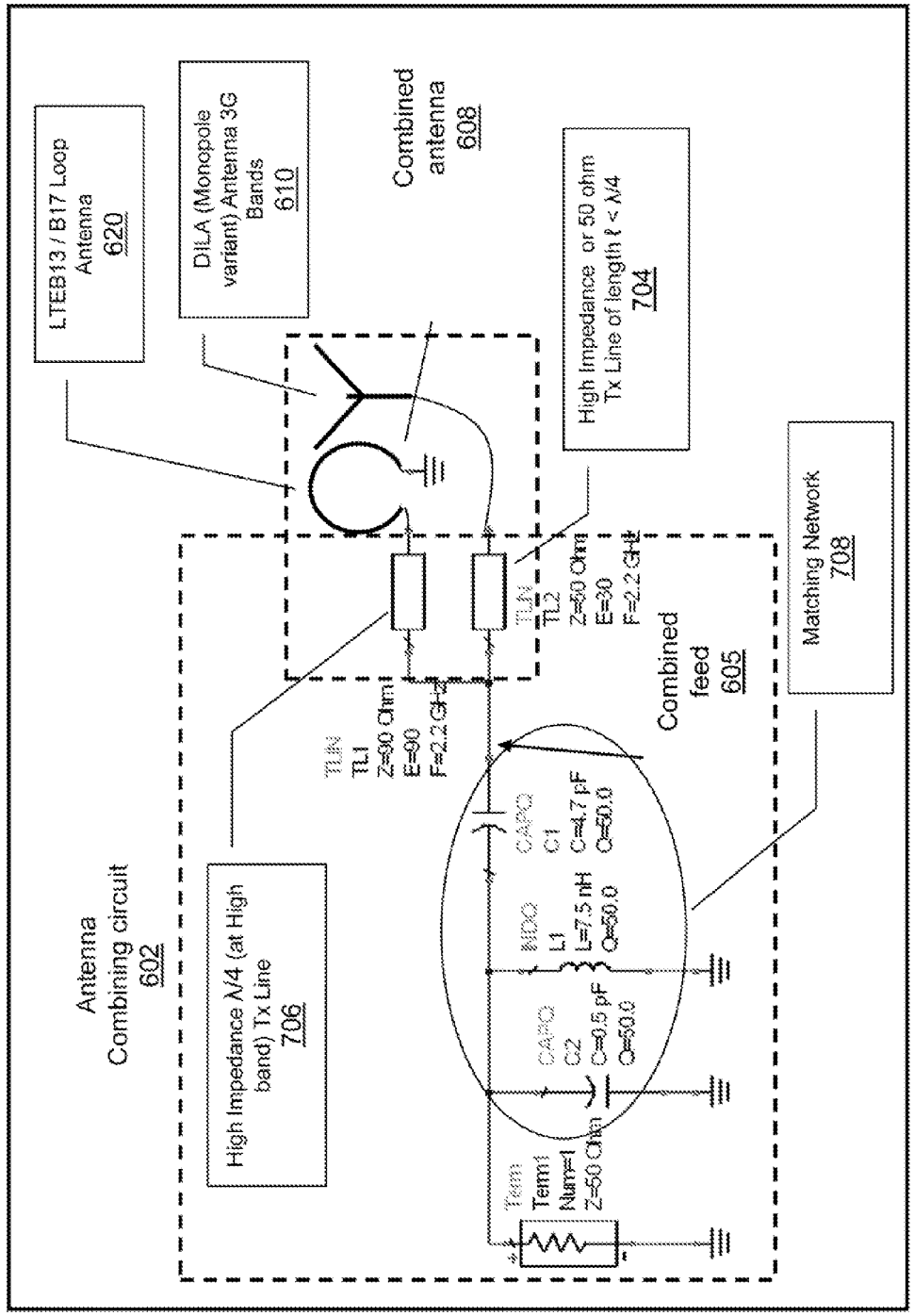
FIG. 7 provides a more detailed illustration of the antenna combining circuit described in FIG. 6, according to one embodiment.

FIG. 7 provides a more detailed illustration of the antenna combining circuit described in FIG. 6, according to one embodiment. Antenna structure 700 comprises antenna combining circuit 602. In addition, antenna structure 700 comprises first antenna element 610 and second antenna element 620 which are both coupled to antenna combining circuit 602. For example, first antenna element 610 can represent a DILA antenna or other monopole variant utilized for 3G CDMA communications. Second antenna element 620 can represent a loop antenna utilized for LTE Band 13 and/or Band 17 communications. Antenna combining circuit 602 comprises several passive components including an impedance matching network 708 having at least one capacitor and at least one inductor. In addition, antenna combining circuit 602 comprises first high impedance 704 coupled to an antenna feed of first antenna element 610, and second high impedance 706 coupled to an antenna feed of second antenna element 620.

As described in FIG. 6, antenna combining circuit 602 combines first antenna element 610 and second antenna element 620 to provide a combined antenna illustrated as combined antenna 608. Antenna combining circuit 602 provides an antenna feed 605 associated with combined single antenna 608.

Figure 8:
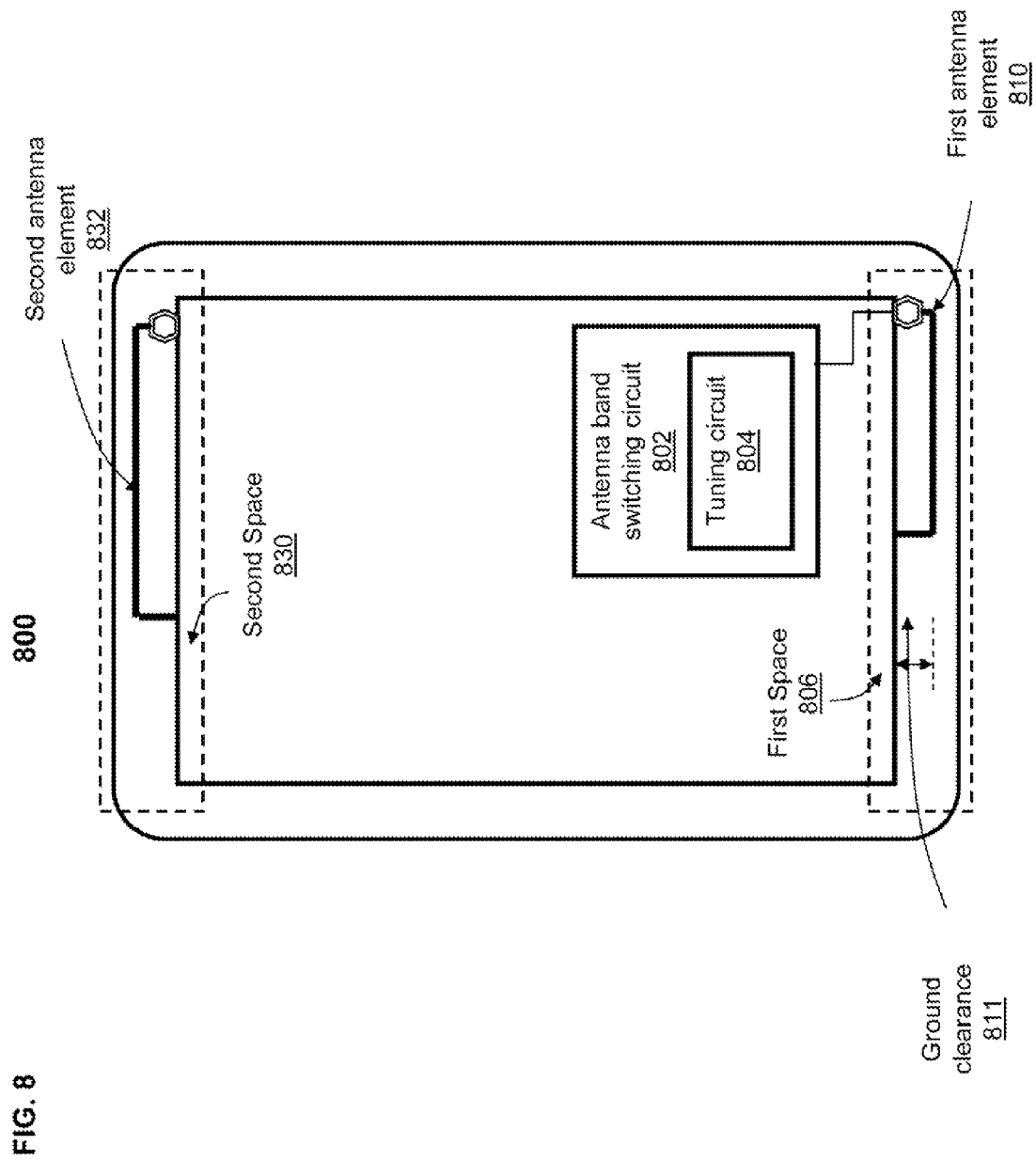
FIG. 8 provides a block diagram representation of a seventh antenna structure having an antenna band switching circuit, according to one embodiment.

FIG. 8 provides a block diagram representation of a seventh antenna structure having an antenna band switching circuit, according to one embodiment. Antenna structure 800 comprises first antenna element 810 at least partially located within first space 806 and second antenna element 832 at least partially located within second space 830. In addition, antenna structure 800 comprises antenna band switching circuit 802. Antenna band switching circuit 802 comprises tuning circuit 804.

In one embodiment, first antenna element 810 is utilized as a first MIMO receiving antenna, and second antenna element 832 is utilized as a second MIMO receiving antenna. In one implementation, first antenna element 810 is at least one of (a) a dual-band inverted L antenna (DILA), (b) a variant of a monopole antenna; and (c) a loop antenna. In a related implementation, second antenna element 832 is a loop antenna.

First antenna element 810 is positioned to provide a pre-calculated clearance distance, ground clearance 811, between first antenna element 810 and a ground plane, where no other metal other than first antenna element 810 is present. In one implementation, the ground plane is affixed to the device chassis. The pre-calculated clearance distance is a key parameter which is used to determine the frequency response bandwidth. Thus, the pre-calculated clearance distance enables first antenna element 810 to provide a wide bandwidth for a low frequency band response.

Generally, if the pre-established distance d (811) is greater than a threshold distance, a wide bandwidth can be achieved for a particular frequency band. For example, in 3G/LTE Tx/Rx communications, if d is larger than 10 mm, a wide bandwidth to support a 700-900 MHz band can be achieved. If d is reduced, then the bandwidth becomes smaller and band switching can be effectively used to cover multiple bands within a range of 700 to 900 MHz. Antenna band switching circuit 802 selectively switches between specific frequency segments of the wide bandwidth of a low frequency band supported by first antenna element 810 to provide signal propagation using various channel segments.

Figure 9:
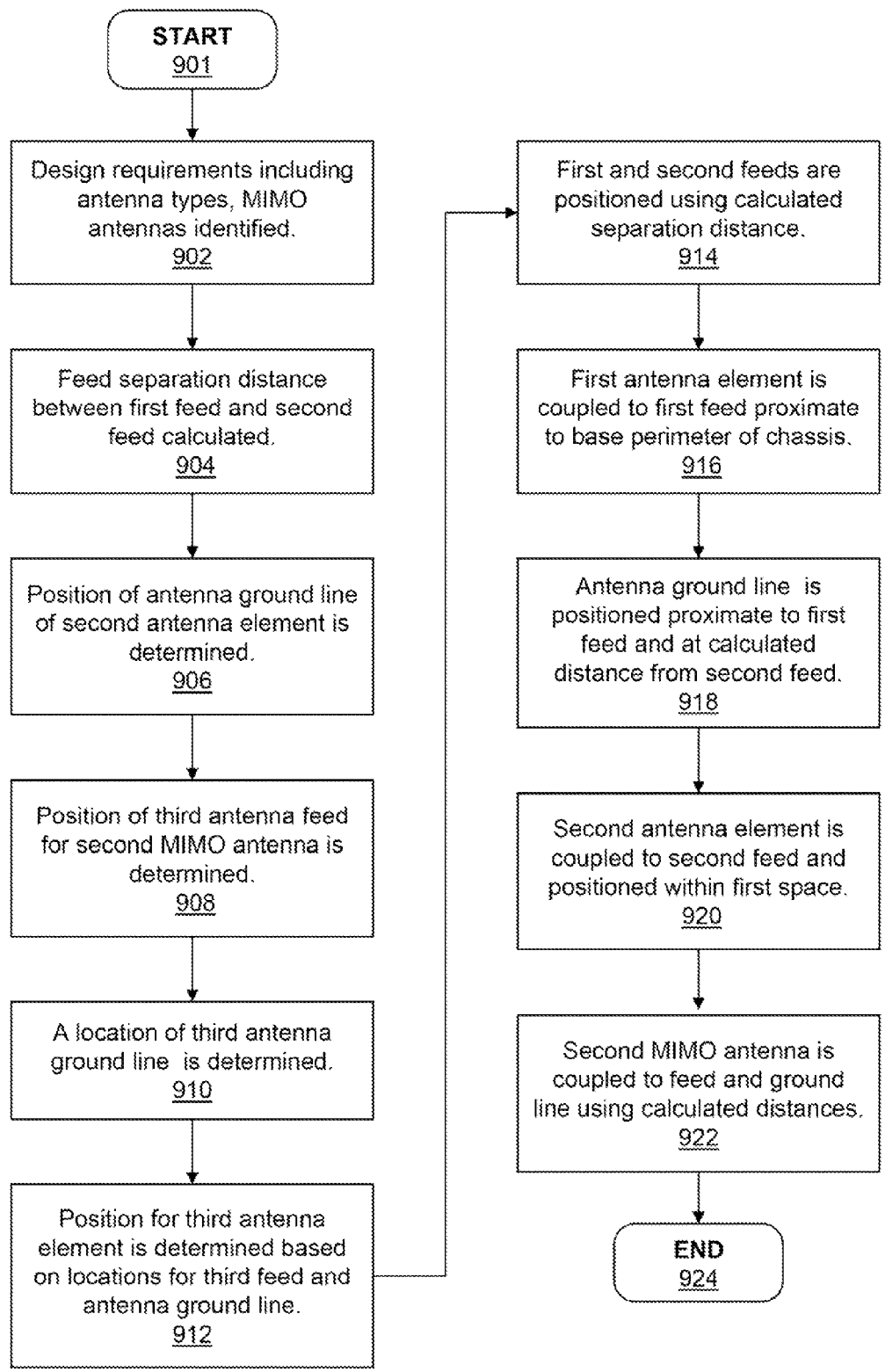
FIG. 9 is a flow chart illustrating one embodiment of a method for designing a multiple input multiple output (MIMO) antenna structure in a wireless communication device, according to one embodiment.

FIG. 9 is a flow chart illustrating an embodiment of a method by which the above process of the illustrative embodiments can be implemented. Specifically, FIG. 9 illustrates one embodiment of a method for designing a MIMO antenna structure in a wireless communication device, according to one embodiment. Although the method illustrated by FIG. 9 may be described with reference to components and functionality illustrated by and described in reference to FIG. 3B, it should be understood that this is merely for convenience and alternative components and/or configurations thereof can be employed when implementing the method. For simplicity in describing the methods, all method processes are described from the perspective of a design and/or manufacturing process for wireless communication device 100 and specifically of a corresponding MIMO antenna structure.

The method of FIG. 9 begins at start block 901 and proceeds to block 902 at which the design process determines a set of functional and physical requirements for implementing a wireless communication device comprising (a) a relatively thin device width and (b) a relatively narrow border around the display, and having support for (i) simultaneous voice and data communications (e.g., SVLTE) and (ii) multiple input multiple output (MIMO) communications. In particular, the design process determines that separate 3G/LTE antennas (i.e., utilizing at least an LTE transmit antenna) that occupy a base portion (e.g., first space 306) of wireless communication device 100 enabling the antenna to be co-located within a same, shared antenna volume. A sufficient and acceptable level of isolation (e.g., at least 10 dB) between the antennas is required to mitigate SVLTE desensitization and avoid having to use a relatively large filter. Furthermore, in order to provide high performance LTE MIMO communications, a low level of correlation between the LTE MIMO receive antennas is required. The level of correlation between the LTE MIMO receive antennas is dependent upon a relative placement of the MIMO antennas. In addition, antenna types are selected for first antenna element 310, second antenna element 320, and third antenna element 332. In one implementation, first antenna element 310 is at least one of (a) a dual-band inverted L antenna (DILA), (b) an inverted F antenna (IFA), (c) a planar inverted F antenna (PIFA), and (d) a variant of a monopole antenna. The DILA, the IFA, the PIFA, and the variant of a monopole antenna each provide a corresponding frequency band response. Additionally, in one or more embodiments, second antenna element 320 is a loop antenna. Similarly, in the one or more embodiments, third antenna element 332 is a loop antenna. Additionally, one of first antenna element 310 and second antenna element 320 is selected as a first MIMO receiving antenna, and third antenna element 332 is designated as the second MIMO receiving antenna.

At block 904, a feed separation distance (314) between first antenna feed 308 for first antenna element 310 and second antenna feed 322 for second antenna element 320 is calculated. Both antennas are utilized to enable SVLTE, and the calculated feed separation distance 314 represents a first aspect of multiple aspects that are collectively used to provide the acceptable level of antenna isolation (e.g., at least 10 dB) required to mitigate SVLTE desensitization and to avoid having to use the relatively large filter.

At block 906, a position of an antenna ground line 324 of second antenna element 320 is determined. These calculations associated with determining the position of the antenna ground line indicate that the antenna ground line is to be positioned proximate to first antenna feed and at a specific distance from second antenna feed. The determined relative positions of the antenna ground line, the first antenna feed, and the second antenna feed represent a second aspect that is included within a plurality of aspects utilized to provide the acceptable level of antenna isolation.

At block 908, a position of a third antenna feed 336 for second MIMO antenna 332 is determined. In particular, vertical and horizontal separation distances between third antenna feed 336 and the antenna feed corresponding to the selected first MIMO receiving antenna are calculated. At block 910, a location of third antenna ground line 338 is determined. In particular, third antenna ground line 338 is calculated to be at a specific separation distance from third antenna feed 336. As a result, a position for third antenna element 332 is also determined based on locations determined for third antenna feed 336 and third antenna ground line 338, as shown at block 912. Third antenna element 332 is positioned within a second portion (e.g., second space 330) of wireless communication device 100. Furthermore, the relative horizontal placement determined using the horizontal separation distance between third antenna feed 336 and the antenna feed for first MIMO receiving antenna determines acceptable locations for third antenna element 332 within second space 330. For example, when third antenna element 332 (i.e., second LTE MIMO receiving Loop Antenna) is positioned in second space 330 so that the corresponding antenna feed and ground is at the same corner (i.e., right corner or left corner) as the antenna feed and ground for the first LTE MIMO Loop antenna, low correlation between the antennas at a specific operating frequency (e.g., 750 MHz) can be achieved.

At block 914, first antenna feed 308 and second antenna feed 322 are respectively coupled to signal communication components and placed in first space 306 using calculated feed separation distance 314. At block 916, first antenna element 310 is coupled to first antenna feed 308 proximate to base perimeter segment 326 of chassis 316, which coupling enables first antenna element 310 to be positioned proximate to and/or affixed to base panel 323 of device housing 304. At block 918, antenna ground line 324 is positioned proximate to first antenna feed 308 and at a specific calculated distance from second antenna feed 322. At block 920, second antenna element 320, designated as a first MIMO antenna is coupled to second antenna feed 322 and antenna ground line 324 and positioned within a same antenna volume as first antenna element 310. At block 922, second MIMO antenna 332 is coupled to third antenna feed 336 proximate to a top perimeter segment of chassis 316, using the calculated vertical and horizontal distances. The process ends at block 924.

In the foregoing discussion, the disclosure is described with reference to a specific example of SVLTE (3G/4G) applications. However, the disclosed ideas and concepts can be extended to be used in Multiple Input Multiple Output (MIMO) and Carrier Aggregation applications, where multiple transceivers and antenna combinations are utilized.

The flowcharts and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An antenna structure comprising:
a plurality of antenna elements configured in an arrangement of relative spacing and relative position of antennas, wherein each of the plurality of antenna elements are coupled to a respective antenna feed, and at least one antenna element from among the plurality of antenna elements is respectively coupled to a corresponding antenna ground line attached to a ground plane, wherein the plurality of antenna elements include a first antenna element positioned to be at least partially located within a first space substantially adjacent to a base perimeter segment of a device chassis to which components of at least one signal communication circuit are affixed; and
a first antenna feed extending from the signal communication circuit into the first space and coupled within the first space to the first antenna element;
wherein components from at least one of (a) the plurality of antenna elements, (b) corresponding antenna feeds, and (c) corresponding antenna ground lines are each positioned relative to other components to provide a multiple input multiple output (MIMO) antenna configuration, exhibiting at least one of (1) a pre-determined level of isolation between at least two antenna elements among the plurality of antenna elements and (2) a pre-defined low level of correlation between a first MIMO receiving antenna and a second MIMO receiving antenna; and
each of the plurality of antenna elements is at least one of (a) placed proximate to a particular perimeter segment of the device chassis, and (b) affixed to a surface of a corresponding housing panel of a device housing that encloses the device chassis.

2. The antenna structure of claim 1, wherein:
the first antenna feed and the first connection point are located within a first section of the first space at a first pre-calculated offset distance from a center position of the first space; and
the antenna structure further comprises:
a second antenna element located within a same antenna volume as the first antenna element, wherein the second antenna element is also at least partially located within the first space;
a second antenna feed coupled within a second section of the first space to the second antenna element at a second pre-calculated offset distance from a center position of the first space, wherein the second section is opposed to the first section of the first space;
an antenna ground line attached to a ground plane and coupled within the first section to the second antenna element, wherein the antenna ground line is at a first pre-calculated separation distance from the second antenna feed, and wherein the antenna ground line does not cross the first antenna feed; and
the first antenna feed and the second antenna feed are placed in first positions relative to each other, and the first antenna feed and the antenna ground line are placed in second positions relative to each other, in order to achieve a pre-determined level of isolation between the first antenna element and the second antenna element.

3. The antenna structure of claim 2, wherein:
at least one of the first antenna element and the second antenna element is configured for use as a MIMO receiving antenna;
when the first antenna element is configured for use as a first MIMO receiving antenna, the second antenna element is configured as a transmit antenna;
the second antenna element is configured as a transmit and receive antenna when the second antenna element is the first MIMO receiving antenna;
the first antenna element is at least one of (a) a dual-band inverted L antenna (DILA), (b) an inverted F antenna (IFA), (c) a planar inverted F antenna (PIFA), and (d) a variant of a monopole antenna, wherein the dual-band inverted L antenna (DILA), the inverted F antenna (IFA), the planar inverted F antenna (PIFA), and the variant of a monopole antenna each provide a corresponding frequency band response;
the second antenna element is a loop antenna; and
the first antenna element and the second antenna element are respectively configured to provide a first frequency response and a second frequency response to support a simultaneous voice and data communication mode.

4. The antenna structure of claim 3, wherein:
the plurality of antenna elements further comprises a third antenna element that operates as a second MIMO receiving antenna, wherein the second MIMO receiving antenna is at least partially located within a second space adjacent to a second perimeter segment of the device chassis, wherein said second space is at an opposing end of the chassis relative to the first space;
the antenna structure further comprises:
a third antenna feed located within the second space and coupled within the second space to the second MIMO receiving antenna; and
a MIMO-antenna ground line attached to a ground plane and coupled within the second space to the second MIMO receiving antenna, wherein the MIMO-antenna ground line is at a second pre-calculated separation distance from the third antenna feed;
the second MIMO receiving antenna, the third antenna feed and the MIMO-antenna ground line are respectively positioned relative to at least one of (a) the first antenna element, (b) the first antenna feed, (c) the second antenna element, (d) the second antenna feed, and (e) the antenna ground line of the second antenna element, in order to achieve a pre-defined low level of correlation between (a) one of the first and second antenna elements and (b) the second MIMO receiving antenna; and
the first antenna feed, the second antenna feed and the third antenna feed are each associated with at least one signal communication circuit.

5. The antenna structure of claim 3, wherein:
the plurality of antenna elements further comprises a third antenna element that operates as a second MIMO receiving antenna, wherein the second MIMO receiving antenna is at least partially located within a first side space adjacent to a third perimeter segment that is substantially perpendicular to the base perimeter segment and the second perimeter segment of the device chassis;
the antenna structure further comprises:
a third antenna feed located within the first side space and coupled within the first side space to the second MIMO receiving antenna; and
a MIMO-antenna ground line attached to a ground plane and coupled within the first side space to the second MIMO receiving antenna, wherein the MIMO-antenna ground line is at a third pre-calculated separation distance from the third antenna feed;
the second MIMO receiving antenna, the third antenna feed and the MIMO-antenna ground line are respectively positioned relative to at least one of (a) the first antenna element, (b) the first antenna feed, (c) the second antenna element, (d) the second antenna feed, and (e) the antenna ground line of the second antenna element in order to achieve a pre-defined low level of correlation between (a) one of the first and second antenna elements and (b) the second MIMO receiving antenna; and the first antenna feed, the second antenna feed and the third antenna feed are each associated with at least one signal communication circuit.

6. The antenna structure of claim 2, further comprising:

a combining network that includes an impedance matching circuitry and which combines the first antenna element and the second antenna element into a combined single antenna having a wide bandwidth for a low frequency band response;

a third antenna feed associated with the combined single antenna;

wherein the combined single antenna provides a first MIMO receiving antenna, the third antenna feed supports propagation of signals that require the wide bandwidth in a low frequency band, the first antenna element is pre-configured to provide a first frequency band response that is a high frequency band response, the second antenna element is pre-configured to provide a second frequency band response, and the combined single antenna is configured to enable the first antenna element of the combined single antenna to substantially maintain and provide the high frequency band response.

7. The antenna structure of claim 1, wherein:

said first antenna element is positioned to provide a pre-calculated clearance distance between the first antenna element and a ground plane, which distance enables the first antenna element to provide a wide bandwidth for a low frequency band response;

the first antenna element is at least one of (a) a dual-band inverted L antenna (DILA), (b) a variant of a monopole antenna; and (c) a loop antenna; and the first antenna element is utilized as a first MIMO receiving antenna.

8. The antenna structure of claim 7, further comprising:

an antenna band switching mechanism that selectively switches between specific frequency segments of the wide bandwidth of a low frequency band supported by the first antenna element to provide signal propagation.

9. The antenna structure of claim 1, wherein:

the first antenna element operates as a first MIMO receiving antenna;

the plurality of antenna elements further comprises a second antenna element that operates as a second MIMO receiving antenna, wherein the second MIMO receiving antenna is at least partially located within a second space adjacent to a second perimeter segment of the device chassis, wherein said second space is opposed to the first space, wherein the second perimeter segment is an opposing perimeter segment to the base perimeter segment; and the antenna structure further comprises:

a MIMO-antenna feed located within the second space and coupled within the second space to the second MIMO receiving antenna; and a MIMO-antenna ground line attached to a ground plane and coupled within the second space to the second MIMO receiving antenna, wherein the MIMO-antenna ground line is at a second pre-calculated separation distance from the MIMO-antenna feed; and wherein the second MIMO receiving antenna, the MIMO-antenna feed and the MIMO-antenna ground line are positioned relative to at least one of (a) the first antenna element, (b) the first antenna feed, and (c) a ground line attached to the first antenna element, in order to achieve a pre-defined low level of correlation between the first MIMO receiving antenna and the second MIMO receiving antenna.

10. The antenna structure of claim 1, wherein:

the first antenna element operates as a first MIMO receiving antenna;

the plurality of antenna elements further comprises a second antenna element that operates as a second MIMO receiving antenna, wherein the second MIMO receiving antenna is at least partially located within a first side space adjacent to a third perimeter segment of the device chassis; and the antenna structure further comprises:

a MIMO-antenna feed located within the first side space and coupled within the first side space to the second MIMO receiving; and a MIMO-antenna ground line attached to a ground plane and coupled within the first side space to the second MIMO receiving antenna, wherein the MIMO-antenna ground line is at a third pre-calculated separation distance from the MIMO-antenna feed; and wherein the second MIMO receiving antenna, the MIMO-antenna feed and the MIMO-antenna ground line are positioned relative to at least one of (a) the first antenna element, (b) the first antenna feed, and (c) a ground line attached to the first antenna element, in order to achieve a pre-defined low level of correlation between the first MIMO receiving antenna and the second MIMO receiving antenna.

11. A wireless communication device comprising:

a device chassis on which device components can be placed;

at least one signal communication circuit located on the device chassis and providing a plurality of antenna feeds;

a plurality of antenna elements configured in an arrangement of relative spacing and relative position of antennas, wherein each of the plurality of antenna elements are coupled to a respective antenna feed, and at least one antenna element from among the plurality of antenna elements is respectively coupled to a corresponding antenna ground line attached to a ground plane, wherein the plurality of antenna elements include a first antenna element positioned to be at least partially located within a first space substantially adjacent to a base perimeter segment of the device chassis to which components of the at least one signal communication circuit are affixed; and a first antenna feed extending from the signal communication circuit into the first space and coupled within the first space to the first antenna element;

wherein components from at least one of (a) the plurality of antenna elements, (b) corresponding antenna feeds, and (c) corresponding antenna ground lines are each respectively positioned relative to other components to provide a multiple input multiple output (MIMO) antenna configuration, exhibiting at least one of (1) a pre-determined level of isolation between at least two antenna elements among the plurality of antenna elements and (2) a pre-defined low level of correlation between a first MIMO receiving antenna and a second MIMO receiving antenna each of the plurality of antenna elements is at least one of (a) placed proximate to a particular perimeter segment of the device chassis, and (b) affixed to a surface of a corresponding housing panel of a device housing that encloses the device chassis.

12. The wireless communication device of claim 11, wherein:
the wireless communication device further comprises a device housing that at least partially encloses the device chassis and has a base panel, a second panel opposed to the base panel and at least one side panel extending from an end of the base panel to an end of the second panel; and
the base perimeter segment is adjacent to the base panel, wherein each of the plurality of antenna elements is at least one of (a) placed proximate to a particular perimeter segment of the device chassis, and (b) affixed to a surface of a corresponding housing panel of the device housing;
the plurality of antenna elements further comprises a second antenna element located within a same antenna volume as the first antenna element, wherein the second antenna element is also at least partially located within the first space;
the first antenna feed is located within a first section of the first space at a first pre-calculated offset distance from a center position of the first space; and
the antenna structure further comprises:
a second antenna feed coupled within a second section of the first space to the second antenna element at a second pre-calculated offset distance from a center position of the first space, wherein the second section is opposed to the first section of the first space;
an antenna ground line attached to a ground plane and coupled within the first section to the second antenna element, wherein the antenna ground line is at a first pre-calculated separation distance from the second antenna feed, and wherein the antenna ground line does not cross the first antenna feed; and
the first antenna feed and the second antenna feed are placed in first positions relative to each other, and the first antenna feed and the antenna ground line are placed in second positions relative to each other, in order to achieve a pre-determined level of isolation between the first antenna element and the second antenna element.

13. The wireless communication device of claim 12, wherein at least one of the first antenna element and the second antenna element is configured for use as a MIMO receiving antenna;
when the first antenna element is configured for use as a first MIMO receiving antenna, the second antenna element is configured as a transmit antenna;
the second antenna element is configured as a transmit and receive antenna when the second antenna element is the first MIMO receiving antenna;
the first antenna element is at least one of (a) a dual-band inverted L antenna (DILA), (b) an inverted F antenna (IFA), (c) a planar inverted F antenna (PIFA), and (d) a variant of a monopole antenna, wherein the dual-band inverted L antenna (DILA), the inverted F antenna (IFA), the planar inverted F antenna (PIFA), and the variant of a monopole antenna each provide a corresponding frequency band response;
the second antenna element is a loop antenna; and
the first antenna element and the second antenna element are respectively configured to provide a first frequency response and a second frequency response to support a simultaneous voice and data communication mode.

14. The wireless communication device of claim 13, wherein:
the plurality of antenna elements further comprises a third antenna element that operates as a second MIMO receiving antenna, wherein the second MIMO receiving antenna is at least partially located within a second space adjacent to a second perimeter segment of the device chassis, wherein said second space is at an opposing end of the chassis relative to the first space;
the antenna structure further comprises:
a third antenna feed located within the second space and coupled within the second space to the second MIMO receiving antenna; and
a MIMO-antenna ground line attached to a ground plane and coupled within the second space to the second MIMO receiving antenna, wherein the MIMO-antenna ground line is at a second pre-calculated separation distance from the third antenna feed;
the second MIMO receiving antenna, the third antenna feed and the MIMO-antenna ground line are respectively positioned relative to at least one of (a) the first antenna element, (b) the first antenna feed, (c) the second antenna element, (d) the second antenna feed, and (e) the antenna ground line of the second antenna element, in order to achieve a pre-defined low level of correlation between the first MIMO receiving antenna and the second MIMO receiving antenna; and
the first antenna feed, the second antenna feed and the third antenna feed are each associated with at least one signal communication circuit.

15. A method for making the wireless communication device of claim 14, comprising placing each of the plurality of antenna elements in a location relative to each other and coupling each of the plurality of antenna elements to a respective antenna feed and antenna ground to provide a MIMO antenna configuration that supports simultaneous voice and data communication, while achieving at least one of (1) a pre-determined level of isolation between at least two antenna elements among the plurality of antenna elements and (2) a pre-defined low level of correlation between a first MIMO receiving antenna and a second MIMO receiving antenna.

16. A method for making the wireless communication device of claim 13, comprising placing each of the plurality of antenna elements in a location relative to each other and coupling each of the plurality of antenna elements to a respective antenna feed and antenna ground to provide a MIMO antenna configuration that supports simultaneous voice and data communication, while achieving at least one of (1) a pre-determined level of isolation between at least two antenna elements among the plurality of antenna elements and (2) a pre-defined low level of correlation between a first MIMO receiving antenna and a second MIMO receiving antenna.

17. The wireless communication device of claim 12, further comprising:
a combining network that includes an impedance matching circuitry and which combines the first antenna element and the second antenna element into a combined single antenna having a wide bandwidth for a low frequency band response;
a third antenna feed associated with the combined single antenna;
wherein the combined single antenna provides a first MIMO receiving antenna, the third antenna feed supports propagation of signals that require the wide bandwidth in a low frequency band, the first antenna element is pre-configured to provide a first frequency band response that is a high frequency band response, the second antenna element is pre-configured to provide a second frequency band response, and the combined single antenna is configured to enable the first antenna element of the combined single antenna to substantially maintain and provide the high frequency band response.

18. A method for making the wireless communication device of claim 12, comprising placing each of the plurality of antenna elements in a location relative to each other and coupling each of the plurality of antenna elements to a respective antenna feed and antenna ground to provide a MIMO antenna configuration that supports simultaneous voice and data communication, while achieving at least one of (1) a pre-determined level of isolation between at least two antenna elements among the plurality of antenna elements and (2) a pre-defined low level of correlation between a first MIMO receiving antenna and a second MIMO receiving antenna.

19. The wireless communication device of claim 11, wherein:
said first antenna element is positioned to provide a pre-calculated clearance distance between the first antenna element and a ground plane, which distance enables the first antenna element to provide a wide bandwidth for a low frequency band response;

the first antenna element is at least one of (a) a dual-band inverted L antenna (DILA), (b) a variant of a monopole antenna; and (c) a loop antenna;

the first antenna element is utilized as a first MIMO receiving antenna; and the MIMO antenna configuration further comprises an antenna band switching mechanism that selectively switches between specific frequency segments of the wide bandwidth of a low frequency band supported by the first antenna element to provide signal propagation.

20. A method for making the wireless communication device of claim 19, comprising placing each of the plurality of antenna elements in a location relative to each other and coupling each of the plurality of antenna elements to a respective antenna feed and antenna ground to provide an antenna configuration that supports MIMO communication, while achieving at least one of (1) a pre-determined level of isolation between at least two antenna elements among the plurality of antenna elements and (2) a pre-defined low level of correlation between a first MIMO receiving antenna and a second MIMO receiving antenna.

* * * * *